United States Patent [19]
Purser

[11] Patent Number: 5,149,304
[45] Date of Patent: Sep. 22, 1992

[54] ARRANGEMENT INCLUDING A MOVEABLE TOWER

[76] Inventor: Michael H. Purser, Innovation, South Efford Barns, Aveton Gifford, Kingsbridge, Devon TQ7 4NX, United Kingdom

[21] Appl. No.: 334,516

[22] Filed: Apr. 7, 1989

[30] Foreign Application Priority Data

Apr. 9, 1988 [GB] United Kingdom ............... 8808368

[51] Int. Cl.[5] .............................................. A63G 31/00
[52] U.S. Cl. ...................................... 472/131; 472/136; 472/137
[58] Field of Search ............... 272/6; 52/29; 472/131, 472/136, 137

[56] References Cited

U.S. PATENT DOCUMENTS 2,189,486  2/1940  D'Amico .

FOREIGN PATENT DOCUMENTS

| 2026714 | 1/1972 | Fed. Rep. of Germany . |
| 2416159 | 8/1979 | France . |
| 626638 | 7/1949 | United Kingdom . |
| 655970 | 8/1951 | United Kingdom . |
| 764668 | 12/1956 | United Kingdom . |
| 1016264 | 1/1966 | United Kingdom . |
| 1106258 | 3/1968 | United Kingdom . |
| 1411519 | 10/1975 | United Kingdom . |
| 1062961 | 11/1981 | United Kingdom . |
| 2075567 | 11/1981 | United Kingdom . |

Primary Examiner—Richard E. Chilcot, Jr.
Attorney, Agent, or Firm—Lowe, Price, LeBlanc & Becker

[57] ABSTRACT

A tower is located within a tube and is arranged to displace a liquid, which preferably is water. The tower may be arranged to float in the water and its buoyancy is controlled to cause movement of the tower relative to the tube. An observation gallery may be is carried at the top of the tower for carrying passengers, being arranged to rotate relative to the tower. As the tower floats in water, and the volume of tower structure which moves out of the water is minimal, the amount of energy required to move it from the bottom of the tube to its highest position may be made relatively small.

19 Claims, 3 Drawing Sheets

ARRANGEMENT INCLUDING A MOVEABLE TOWER

BACKGROUND OF THE INVENTION

This invention relates to an arrangement which includes a moveable tower and more particularly, but not exclusively, to a tower which includes an accommodation section for carrying passengers.

Many people enjoy visiting amusement or theme parks where they may experience various rides. The present invention arose in an attempt to design a new ride which would be thrilling and attractive for the participants and yet completely safe. It is believed that the invention also has applications in other fields.

SUMMARY OF THE INVENTION

According to the invention there is provided an arrangement comprising a tower located within a tube and arranged to displace a liquid, and means for moving the tower relative to the tube. Since the tower is arranged to displace liquid, which conveniently is water, the apparent weight of the tower is reduced. Thus less energy is required to produce movement of the tower than would otherwise be the case and this may result in significant savings where the tower is a relatively large structure. As mentioned above, the invention arose from a consideration of new forms of entertainment rides, but it is envisaged that it could be implemented in other arrangements. For example, the tower may be an antenna or a windmill. By employing the invention, its height may be adjusted to achieve the most efficient operation, or it may be retracted altogether in high winds or for repair and maintenance. The tower may be wholly or partly located within the tube, which itself may be wholly or partly located in a shaft in the ground or in a fixed supporting structure, or the tube may itself be a shaft in the ground.

Advantageously, the tower is arranged to float in the liquid in at least one of its positions relative to the tube. Then the maximum displacement of liquid, and hence reduction in apparent weight, is achieved. The tower may float for all its positions in the tube but it could, for example, rest on the bottom of the tube at its lowermost position, or be clamped in position at a point or points along the tube. Preferably, the height of the tower relative to the liquid surface is adjustable, although the change in height of the tower relative to the ground level or the tube could be achieved, for example by changing the amount of liquid in the tube. It is preferred that means are included for altering the buoyancy of the tower to adjust its height. This could be achieved using buoyancy tanks which can be attached to, or removed from, the tower, but preferably ballast tank means are included, the buoyancy of which may be controlled to control movement of the tower. This may conveniently be achieved by storing compressed gas, advantageously carried by the tower itself, and by controlling the release of gas into the ballast tank means. Of course, an external supply of gas could be provided, the gas being fed to the tower for direct use or for replenishing a compressed gas supply tank carried by the tower. The ballast tank means comprises an operating tank which is arranged to be flooded with liquid and blown empty with gas and is connected to a ready-use tank which is arranged to receive gas from storage tank means. Alternatively, pumping means may be included for pumping liquid from the operating tank.

A safety ballast tank may be included having valve means located at its lower end. The whole of the safety ballast tank may be arranged to lie below the surface level of the liquid when the tower is in its lowermost position. The safety ballast tank is conveniently located near the upper end of the tower and can be arranged to ensure that the tower remains in its lowermost position by allowing liquid to flood in through open valve means which are then shut to retain the liquid. When it is wished to raise the tower, gas is released into the tank and the valve means opened to expel the liquid. Conveniently, the compressed gas, when used, may be arranged to supply power for operation or control, either directly via pneumatic lines, or by conversion to electrical power, for example.

The tower may have a small waterplane area relative to the amount of variable buoyancy available. The waterplane of an object is the region intersected by it at the surface of liquid in which it is immersed. The waterplane area of the tower may be made relatively small by constructing it of strong, thin material over that part which moves into and out of the liquid. By arranging that the tower has a small waterplane area over this part of it, the amount of buoyancy change required to move it from its maximum to its minimum height, or vice versa, is small, compared to the change in height achieved. Thus the energy required to move the tower is minimised.

Preferably, the tower includes an accomodation section for carrying passengers. As the tower rises in the tube, noticeable accelerations and velocities may be attained, which is exciting for any passengers carried by the tower. They also have an opportunity to observe their surroundings from a great height. It is believed that a tower arrangement is feasible in which the tower rises to more than 200 m above the ground. The accomodation section may be moveable relative to the tower and preferably is rotatable about the longitudinal axis of the tower. Thus, the passengers can also experience the centrifugal effects which exist when the accommodation section is rotated. To enhance the effects that these movements and height have on the passengers, it is preferred that the walls of the accommodation section are substantially entirely transparent.

Advantageously, a control room section for housing an operator who controls movement of the tower is included in the tower. This may conveniently be located towards the top of the tower and co-axially about its longitudinal axis.

Advantageously, guide rails are included within the tube to guide movement of the tower. Wheels might be attached to the lower part of the tower and arranged to run on guide rails. A substantial portion of the tower at its base may be arranged to extend into the tube even when the tower is at its uppermost position. A framework may be connected to the tower base and is extensive into the tube to give lateral support to the tower and to hold it upright. Advantageously, the tube is of smaller diameter at at least one location along its length, thus providing a braking effect when the tower is lowered because of hydrodynamic friction between the liquid displaced and the surfaces of the tube and the tower. The internal diameter of the tube may be made smaller by inserting a cylinder within it which may be spaced from the tube walls, or by inclining the tube walls. It is preferred that buffer means are included at the base of the tube to further exert a braking effect on the tower. The buffer means may also be arranged to support the tower in the absence of the operating liquid, for example, during maintenance periods.

To achieve impressive dramatic effects, the passenger accommodation section may be arranged to move from the surface of a pool of water and, after maximum extension of the tower, return, to alight on its surface. Advantageously, to produce further dramatic effects, liquid may be locally aerated and, by using its reduced density compared with that of the bulk of the liquid, arranged to spray upwards at the surface or out from the top of the tower. Advantageously, a pool is located at the top of the tube, the pool becoming shallower towards its edges such that waves break at the edge of the pond, further enhancing any dramatic effects.

BRIEF DESCRIPTION OF DRAWINGS

One way in which the invention may be performed is now described by way of example with reference to the accompanying drawings, in which.

DESCRIPTION OF PREFERRED EMBODIMENT

Figure 1:
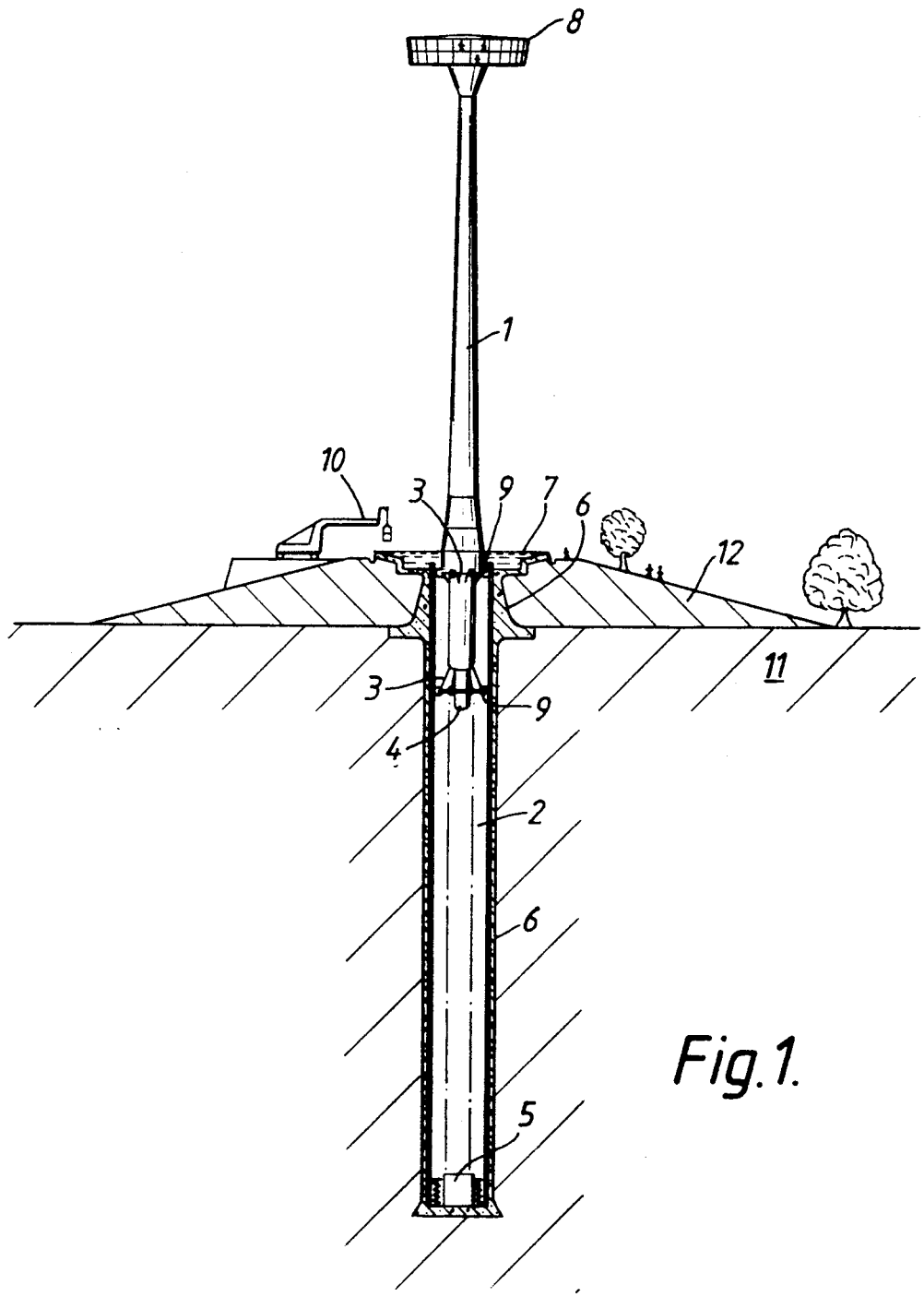
FIG. 1 illustrates an arrangement in accordance with the invention.

With reference to FIG. 1, an arrangement in accordance with the invention includes a tower 1 which is 90 m in height and which is hollow and of steel. The tower 1 is located in a tube 2 in the ground. The tube 2 has a diameter of about 10 m and is 115 m deep. The tower 1 is moveable within the tube 2 between the position shown in FIG. 1, which is its highest position, and its lower position in which the tower 1 is almost entirely contained within the tube 2. The base of the tower 1, includes frameworks 3 and buoyancy vessels, which are shown in greater detail in FIG. 2, which form a buffer spigot 4 at their lower ends. The buffer spigot 4 is arranged to enter a buffer cylinder 5 when the tower is in its lowermost position to provide hydrodynamic braking. The tube 2 is formed of concrete 6 and during operation is filled with water to the level indicated at 7 and is kept overflowing by a pumping system (not shown) to enhance the visual effect of the arrangement. The arrangement illustrated is intended to be used in amusement parks, theme parks and exhibition sites and includes a passenger accommodation section in the form of an observation gallery 8 which is located at the top of the tower 1.

The tower 1 floats in the water contained within the tube 2 and its buoyancy is adjusted by means of ballast tanks to control the height of the tower above ground level. This is described in further detail below. Wheels 9 are included at the sides of the frameworks 3 at the base of the tower 1 and are arranged to run on guide rails to guide the movement of the tower 1 within the tube 2.

A removeable gantry lift 10 is provided near the tube 2 to provide access to the bottom of the tube 2 when drained for maintenance purposes. The ground in which the tube 2 is embedded is mostly rock 11 and the upper part is spoil 12 which results from the digging of the shaft within which the tube 2 is located.

Figure 2:
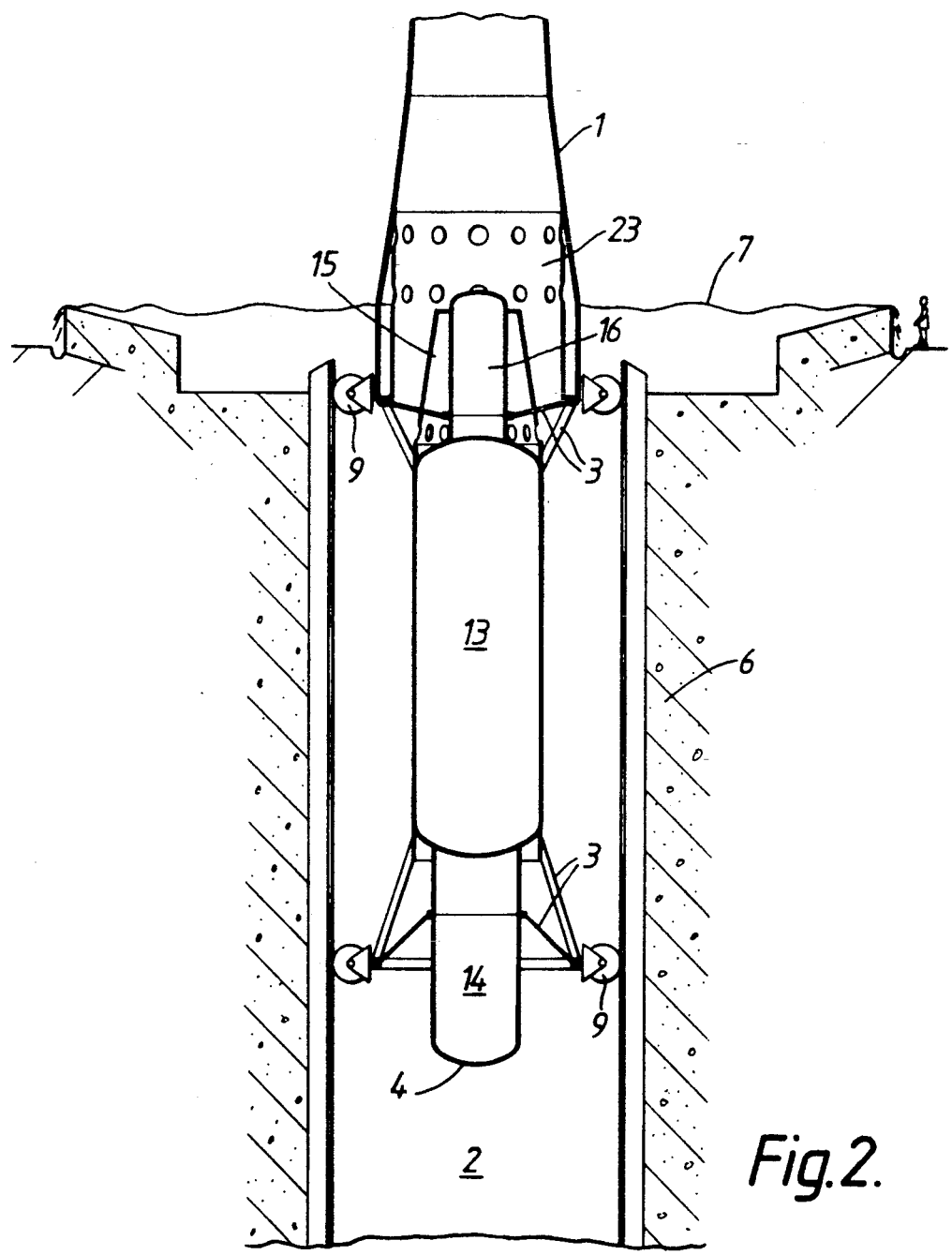
FIG. 2 shows the arrangement of the buoyancy tanks.

The buoyancy tanks are located in the base of the tower 1 and are illustrated in FIG. 2. They comprise a main storage tank 13 having a capacity of approximately 300 m$^3$, a ready use air tank 14 of 60 m$^3$ volume and a ring of operating ballast tanks 15 which are open at their bottom. A compensating ballast tank 16 is also included. The buoyancy tanks are connected to the tower 1 and located in the tube by the frameworks 3. The main storage tank 13 is charged with compressed air to a pressure of about 50 bar overnight for use the following day.

Figure 3:
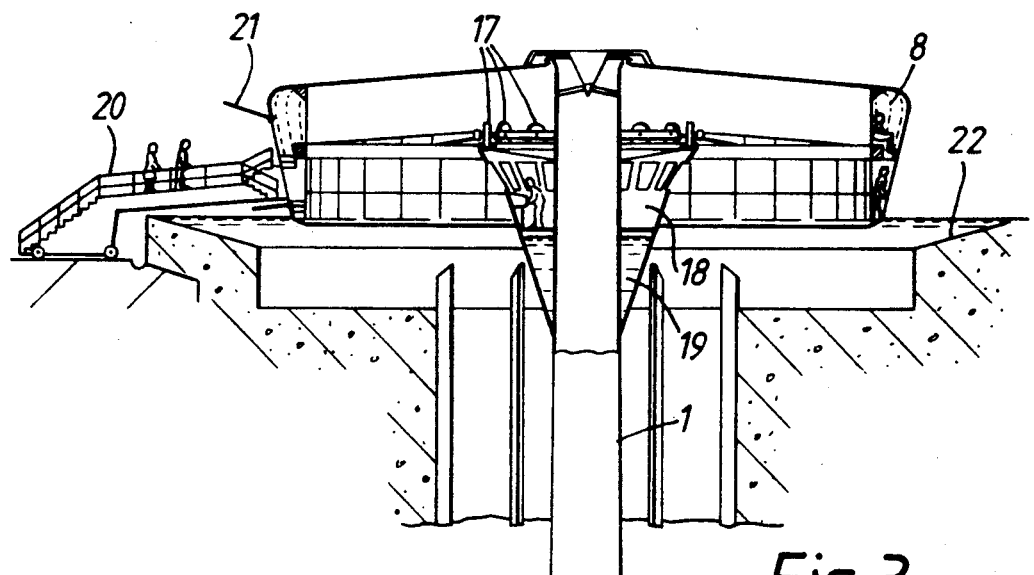
FIGS. 3 and 4 illustrate the top part of the tower shown in FIG. 1 when in its lower positions.

During operation of the tower, initially it is in its lowest position resting on the buffers and the ballast tanks 15 are flooded, this position being shown in FIG. 3. As can be seen more clearly in FIG. 3, the observation gallery 8 is mounted on a bearing 17 arranged to rotate about the longitudinal axis of the tower 1. A control room 18 is positioned at the top of the tower 1 and provides accommodation for an operator who controls movement of the tower 1 and gallery 8. A further ballast tank is located below the control room 18 and constitutes a safety ballast tank 19. This has valves at its lower end and, when flooded, ensures that there is sufficient ballast to hold the tower 1 in its lowermost position, even when no passengers are on board. The passengers embark when the tower is in its lowermost position via a gangways 20. When the loading of the passengers is complete, access doors 21 are closed, using power derived from the compressed air supply, and locked. The tower 1 is then ready to ascend.

Figure 4:
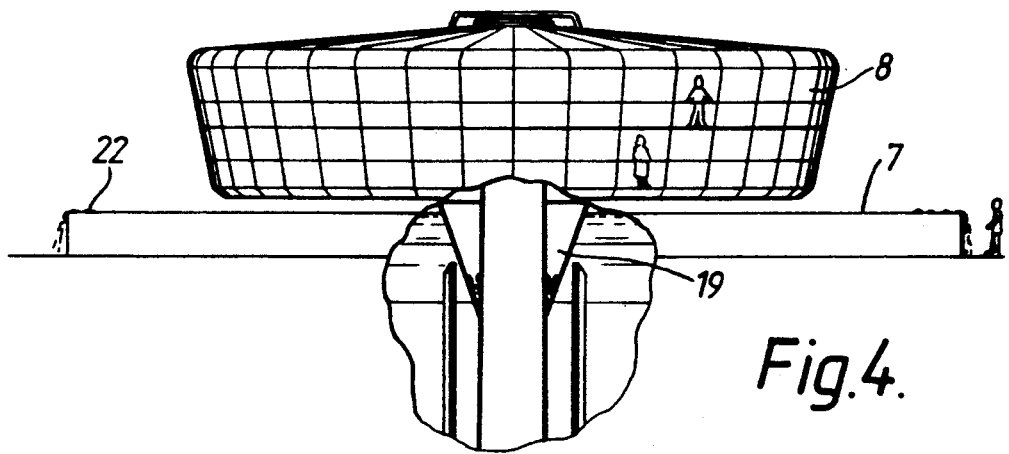

The operator supplies power to a motor which drives the gallery 8 to cause it to rotate and, at the same time, he causes the safety ballast tank 19 to be emptied by opening the bottom valves and releasing air into it. Water from the safety ballast tank 19 discharges through upward facing nozzles, and this, together with the movement of the gallery 8, causes water to spray about the structure and waves to lap over the edges of the pool 22 at the top of the pool 2. Waves tend to be magnified because of the shape of the tube 22, which slopes upwards and outwards, to form a weir at its edges. The people waiting to experience the ride are encouraged to queue around the pool 22, the surface of which is at eye level, so that they are close to the various effects produced in the water. As the safety tank 19 empties, the tower rises to float about 1 m above its lowermost position. This is illustrated schematically in FIG. 4. Valves are then opened by the operator to cause air from the ready use supply 14, which has been previously charged to a pressure of 20 bar, to be supplied to the ballast tanks 15. This causes about 15 tonnes of water to be ejected from the tanks 15 into the tube 2, again causing disturbance of the water at the surface. The tower begins to rise as the ballast tanks 15 are blown empty. The operator then shuts the valves to isolate the ready use tank from the ballast tanks 15, and recharges the ready use supply 14 to 20 bar from the main storage tank 13. It should be noted that the storage and ballast vessels and the compressed air supply are arranged to ensure that there is always more pressure inside the vessels than outside, therefore assisting them to resist the water pressure. As the tower 1 rises, the hydrostatic pressure reduces, thus air in the ballast tanks 15 expands and the remaining ballast water is expelled. All the ballast is discharged by the time the tower 1 has reached its midway point. As the tower 1 rises up out of the water, the amount of buoyancy is reduced by the volume of the tower structure which emerges leading to reduced upthrust. This deccelerates the movement of the tower 1 upwards from the tube 2, and final braking is assisted by the inclusion of a perforated ring 23 (shown in FIG. 2) at the base of the tower 1 which slows draining of water from the base of the tower 1.

As the tower 1 reaches its greatest height, as illustrated in FIG. 1, the operator causes the rotation of the gallery 8 to slow, enabling the passengers to enjoy the view. Then the spin is increased again, and the tower 1 starts to descend. To initiate descent, the operator vents the air from three quarters of the ballast tanks 15. The air is arranged to be vented just under the water surface around the outside of the tower 1 causing agitation, waves, and spray and other dramatic effects. As the water floods in the bottoms of the tanks, the tower 1 falls at about 0.75 m$^2$ per second. As the tower 1 drops in the tube 2, its rate of descent is slowed by the buoyancy of the tower 1. When it reaches its midway point, the air in the remaining ballast tanks 15 is vented inside the base of the tower 1, maintaining the downward momentum and aerating a water column within the tower 1. Restrictor rings may be positioned at levels within the tube 2 to produce slowing, or even reversal, of the velocity of the tower 1 by causing dynamic pressure effects to alter the level of the water column within the tower 1 relative to the outside pond level. The final decceleration of the tower 1 is due to flow of the water which is restricted around the buffer spigot 4 as it enters the buffer cylinder 5. As the gallery 8 approaches ground level, the aerated water within the tower 1 sprays out from the top of the hub and cascades out over the gallery 8 which is still spinning. When the tower 1 has stopped, the operator opens the valves to the safety tank 19 to allow water to enter. The operator also causes about 0.3 tonnes of water to be flooded into the compensating tank 16. This permits compensation to be made for the weight of air vented during the trip. The tower 1 settles onto the buffer pads at the bottom of the tube 2. The gangways 20 extend and the doors 21 unlock and open to allow the passengers to disembark.

It is believed that such an arrangement would enable the tower 1 to make about sixty trips in a day without the necessity to recharge the compressed air supply.

I claim:

1. An arrangement comprising a tube, a liquid at least partly filling said tube, a tower slidably disposed within said tube having sides spaced away from the sides of said tube and arranged to displace said liquid, and means for moving the tower relative to said tube.

2. An arrangement as claimed in claim 1 wherein said tower is arranged to float in the liquid in at least one of its positions relative to said tube.

3. An arrangement as claimed in claim 1, wherein the height of said tower relative to the surface of the liquid is adjustable.

4. An arrangement as claimed in claim 3 and including means for altering the buoyancy of said tower to adjust its height relative to the surface of the liquid.

5. An arrangement as claimed in claim 4 and including storage means for storing compressed gas, said storage means being carried by said tower.

6. An arrangement as claimed in claim 5 wherein said storage means has sufficient storage capacity to enable said tower to move through its full extent of movement a plurality of times without the storage means needing to be recharged.

7. An arrangement as claimed in claim 4, and including ballast tank means, the buoyancy of which is controlled to control movement of said tower.

8. An arrangement as claimed in claim 7 wherein said ballast tank means comprises an operating tank which is arranged to be flooded with liquid and blown empty with gas, said operating tank being connected to a ready use tank which is arranged to receive gas from storage tank means.

9. An arrangement as claimed in claim 7 wherein said ballast tank means comprises an operating tank which is arranged to be emptied and filled with liquid and including pumping means for pumping the liquid from the operating tank.

10. An arrangement as claimed in claim 1, including a safety ballast tank which includes valve means located at its lower end.

11. An arrangement as claimed in claim 10 and wherein said safety ballast tank is located near the upper end of the tower.

12. An arrangement as claimed in claim 1, and including means for locally aerating the liquid whereby agitation at the liquid surface is produced.

13. An arrangement as claimed in claim 12 wherein aerated liquid is arranged to be located within the tower and the aerated liquid level is above that of non-aerated liquid outside the tower.

14. An arrangement as claimed in claim 1 and including means for using compressed air to supply power for operation or control of the tower.

15. An arrangement as claimed in claim 1 wherein said tower includes an accommodation section for carrying passengers.

16. An arrangement as claimed in claim 15 wherein said accommodation section is rotatable relative to the tower about the longitudinal axis of the tower.

17. An arrangement as claimed in claim 1 and including a control room section for housing an operator who controls movement of said tower, the control room section being carried by the tower.

18. An arrangement as claimed in claim 1 wherein the base of said tower is connected to a framework which is extensive in said tube.

19. An arrangement as claimed in claim 1 and including buffer means at the base of said tube, said buffer means comprising an undrainable well into which the base of said tower is arranged to enter, and means for restricting flow of liquid from the well as the tower base enters it.

* * * * *